June 7, 1960   T. B. BISSETT ET AL   2,940,076
PASSIVE POSITION DETERMINING SYSTEM
Filed Feb. 15, 1957
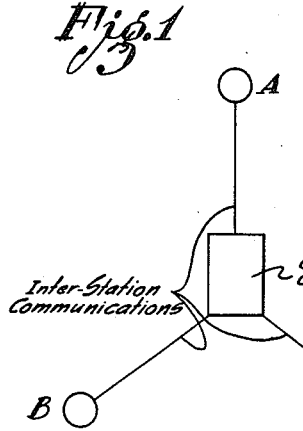
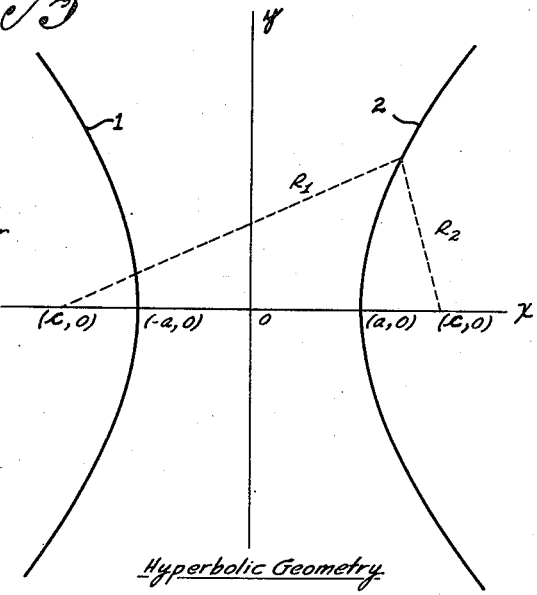
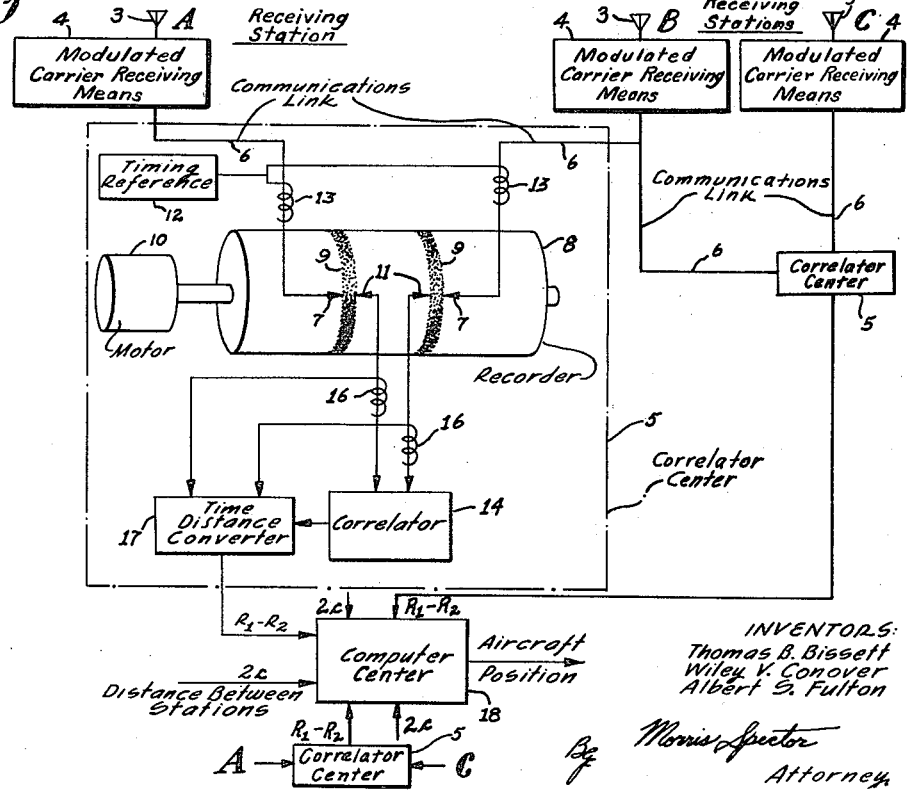
INVENTORS:
Thomas B. Bissett
Wiley V. Conover
Albert S. Fulton
Morris Spector
Attorney United States Patent Office 2,940,076
Patented June 7, 1960

2,940,076

PASSIVE POSITION DETERMINING SYSTEM

Thomas B. Bissett, Redondo Beach, Wiley V. Conover, Tarzana, and Albert S. Fulton, Manhattan Beach, Calif., assignors, by mesne assignments, to Thompson Ramo Wooldridge Inc., Cleveland, Ohio, a corporation of Ohio Filed Feb. 15, 1957, Ser. No. 640,412

3 Claims. (Cl. 343—112)

This invention relates to a position determining system, and more particularly to such a system as will determine the location of an energy radiating source by means of passive listening devices with respect to which the radiating source bears relative motion.

The most effective existing technique for determining the position of energy radiating sources utilize two or more receiving stations which must determine the directions from which the energy originates. Direction finding stations that are capable of providing the necessary accuracy require large and costly antenna installations and are, in general, slow in operation, since the antenna must be pointed in the proper direction to receive the radiation.

With the tremendous increase in the amount of air traffic has come the realization that the existing techniques are inadequate for providing an accurate and continuous means of tracking moving aircraft. The increase in the number of air collisions by the aircraft bearing relatively high velocities with respect to one another indicates that an improved tracking system is necessary to allow efficient and safe navigation on or off the recognized airways.

The position determining system herein disclosed obviates one of the major disadvantages previously noted in connection with presently existing systems in that it determines the position of an energy source in a matter of seconds. Further, only passive receiving devices are needed, thereby simplifying and reducing the cost of ground stations, in addition to increasing the speed of system operation. Moreover, no special equipment need be installed upon the craft being detected, since any craft emitting modulated energy can be located accurately. Previous position determining systems utilizing radar apparatus had great difficulty in detecting small private aircraft because of their size; however, the present system can accurately locate such aircraft provided only that they emit some form of modulated energy such as for example a voice modulated radio carrier wave.

The present invention is based upon an improvement in what may be termed a "hyperbolic line of position" system of direction and/or position determination. Many systems of this general type have been proposed in the prior art, as for example shown in the British Patent 7,172 of 1915, and the patent to J. B. Morrill, 1,406,996, issued February 21, 1922. In the prior art, position determining systems, based upon the use of hyperbolic lines of position, have taken form in arrangements wherein the operator of a craft may determine his position by comparing the relative time delay between versions of specially constituted radio signals received from a plurality of fixed ground based broadcast stations. The "loran" ship navigations system is typical of this type of system. Alternatively, there has been suggested a system which is substantially the "reciprocal" of the loran system in which a plurality of special radio transmitters are borne by a craft to permit a like plurality of ground based stations to obtain "fix" information on the position of the craft.

There has also been suggested a system of bearing determination of this latter "reciprocal" type in which two or more directional receiving stations monitor energy emanating from a craft with each orienting the axes or lines of antennae directivities of two antennae, so that the versions of received energy are brought into time coincidence. The orientations of the antenna then define the general direction of the craft. These prior art techniques, however, do not offer as suitable a solution to the problem of air traffic control as that which the present invention provides. This is because these prior art systems either require special radio transmitting equipment to be borne by the aircraft or they fail to take into account the effect of the relative velocities of aircraft with respect to the receiving stations. This velocity consideration produces what is sometimes termed a "Doppler" shift in the frequency of the wave energy received from the aircraft. The magnitude of this frequency shift is potentially different for each receiving station due to the fact that the component of aircraft velocity in the direction of each station, may be different.

The present invention, therefore, takes advantage of the fact that in general, energy intentionally radiated from an aircraft, such as radio carrier transmissions, are purposely modulated with signal information of a type which is aperiodic and multifrequency in character. Therefore, although the radio carrier wave, per se, may suffer a substantial amount of frequency distortion, percentagewise, due to Doppler effects, the modulation information borne by the carrier, being generally of substantially lower frequency, does not suffer as great a percentage of distortion. This is due to the fact that the modulation component is defined by sideband frequencies closely associated with the carrier frequency. Advantage is further taken of the fact that whereas interference or interferometer type null detection schemes have been useful in the prior art for determining the time-difference between two versions of a signal comprised substantially of sinusoidal components bearing a predetermined frequency versus amplitude distribution, such null techniques are not capable of providing sharp indicia of time agreement between two versions of an aperiodic multifrequency signal. This is especially true under conditions where this latter type constituted signal is contaminated by substantial noise.

The present invention, therefore, embraces the use of a signal correlation system permitting two versions of an aperiodic multifrequency signal to be compared in a manner causing the effects of non-coherent components in the two versions to cancel each other over a predetermined time period which may be termed a smoothing or averaging period. This type of signal correlation process, when used to determine the time relationship between the coherent components of two versions of an intelligence modulated radio carrier, permits Doppler shift errors and random non-coherent noise effects to be minimized, thereby yielding data from which hyperbolic line of position "fixes" may be quickly obtained in aircraft control work.

It is, therefore, one object of this invention to provide a low cost, passive position determining system for determining the location of a modulated energy radiating source bearing relative motion with respect to an observation means.

It is another object of this invention to provide a passive position determining system that is capable of continuously and accurately tracking moving craft.

It is a further object of this invention to provide a passive position determining system in which the craft to be located need only have a minimum of radio equipment to be positively identified and tracked.

It is a still further object of this invention to provide a passive position determining system that can be fabricated from presently available components, and that will not be as subject to inaccuracies caused by weather and terrain effects as are some presently known systems.

Other objects and advantages will appear as the description of the invention proceeds.

Therefore, in accordance with one aspect of the present invention, a radio carrier wave conditionally modulated with aperiodic multifrequency signal information, the highest frequency component of which is a small percentage of the carrier wave frequency, is received by at least two spaced apart receiving stations relative to which the source emanating the carrier wave, bears substantial and potentially different velocities. Means responsive to the modulation borne by the radio carrier wave are then provided for so correlating the two different versions of the received radio signals provided by the two stations, that effects of non-coherent components in the two signal versions are caused to average or cancel out over a predetermined smoothing or averaging time interval. By imposing a controllable value of relative time delay between the two signals, during this correlation process, a sharp accurate indication of the time displacement between the two versions of the carrier as received at the two receiving locations may be determined. Through the use of this type of correlation means, the degree of accuracy of this indication is high compared to the percentage of the potential Doppler frequency shift distortion imposed on the radio carrier wave assignable to any difference in the relative velocities of the source with respect to the two receiving stations.

In further accordance with the present invention, at least three receiving stations are provided, each physically separated from the other by known given distances and directions for monitoring a given area of geographical terrain over which it is expected that a radio transmitter bearing craft may pass. Means are provided at each receiving station, for receiving incoming radio carrier waves modulated by aperiodic multifrequency information, such as voice information signals. These stations, forming three pairs of stations, are further adapted to simultaneously receive and respond to the same radio carrier wave, so that a carrier wave, for example emanating from an aircraft voice type radio transmitter, is received at all three stations. A separate signal version of the voice information bearing signals is thereby provided by each of the three stations. These signal versions are then processed in pairs by signal correlation type circuits of the type in which the effects of non-coherent components, such as noise, appearing in the members of each pair of signal versions, are averaged out over a given smoothing time interval. By imposing a controllable value of relative time between the versions of each pair during the correlation process, at least two time difference signals are developed which are sharp indicia of the differences in the times of the arrival of the carrier wave at the members of different pairs of stations. These time-difference signals correspond to distance-difference information depicting the difference in the lengths of the paths traversed by the radio carrier wave energy in its propagation from the transmitter to the members of different pairs of the receiving stations. These time-difference signals, along with data signals representing the known separation and relative positions of the stations, may then be applied to a computer so programmed as to compute the intersection of at least two hyperbola, each hyperbola being one of a different set of hyperbolas, with each different set being in turn based upon the positions of a different pair of stations as foci. The point of intersection of these hyperbolas may be expressed in a separate system of coordinates serving the area monitored by the stations to permit the position of the transmitter at the time of its transmission to be ascertained.

The features of the invention that are believed to be novel and patentable are pointed out in the claims which form a part of this specification; for a better understanding of the invention, reference is made in the following description to the accompanying drawing, wherein like parts are indicated by like reference numerals, in which:

Figure 1 is a block diagram illustrating the major components of the present passive position determining system;

Figure 2 is a sketch illustrating the geometry involved in making the calculations involved by the present system; and Figure 3 is a block diagram, a portion of this figure being shown in perspective, of the correlator and computer apparatus that performs the necessary position determining services of the invention.

Referring now to Figure 1, there are shown three receiving stations respectively labeled A, B, and C. Each of these stations receives modulated energy radiated from an energy source (not shown) whose position it is desired to determine. The stations are preferably fixed in position and separated from one another by known distances. The distances between the stations must be accurately known, although they need not have any special values. The aforesaid stations are connected by means of links labeled Inter-Station Communications to a single piece of apparatus labeled Correlator and Computer Center. At this correlator and computer center the differences between the paths taken by energy from the source to each pair of stations is measured and utilized to determine the position of the source, as will be explained hereafter.

Referring now to Figure 2, there will be seen a pair of axes labeled $x$ and $y$ on which are shown a pair of symmetrical hyperbolas 1 and 2. Hyperbola 1 has its center at point minus $c$ on the $x$ axis and hyperbola 2 has its center at plus $c$ on the $x$ axis. The hyperbola centers plus $c$ and minus $c$, respectively, represent the positions of two of the stations shown in Figure 1. The distance between any point on hyperbola 2 and the center of hyperbola 1 is labeled $R_1$, and the distance between that same point and the center of hyperbola 2 is labeled $R_2$. Since a hyperbola is defined at the locus of a point such that the difference of its distances from two fixed points is constant, it will be apparent that $R_1-R_2$ equals a constant. This constant difference is equal to $2a$ where $a$ is the intersection of the hyperbolas with the $x$ axis, this equation being derived from the nature of a hyperbola.

Now, the equation for a hyperbola can be stated as follows:

$$\frac{X^2}{a^2} - \frac{Y^2}{c^2 - a^2} = 1 \qquad (1)$$

If the distance between two stations or foci of the pair of hyperbolas is considered to be $d$, then:

$$d = 2c \qquad (2)$$

Further, from the foregoing it will be apparent that:

$$2a = R_1 - R_2 \qquad (3)$$

Squaring both sides of (3) we find:

$$a^2 = \frac{(R_1 - R_2)^2}{4} \qquad (4)$$

Moreover, from (2) we find:

$$c^2 = \frac{d^2}{4} \qquad (5)$$

Substituting (4) and (5) into (1), we find:

$$\frac{X^2}{\frac{(R_1-R_2)^2}{4}} - \frac{Y^2}{\frac{d^2 - (R_1-R_2)^2}{4}} = 1 \qquad (6)$$

Examining Equation 6 it will be noted that aside from the X and Y terms therein the remaining quantities are either known constants or can be measured. Thus $d$ is the known distance between the pair of stations for which the hyperbolas are being constructed, and $R_1-R_2$ is determined at the correlator and computer center of Figure 1. Therefore, once $R_1-R_2$ is measured an equation for X and Y only can be obtained, and when two such equations are obtained from two pairs of stations the intersection point of the hyperbolas will determine the location of the energy source whose differences in distance from the stations were measured in order to determine the hyperbolas. This general treatment is more fully considered in the above referenced British Patent 7,172 of 1915.

In order to obtain $R_1-R_2$ the two signals received by two stations from the same source are matched or correlated and the time delay required to achieve this match will be directly proportional to $R_1-R_2$. To measure this time delay, the signals according to the present invention must be modulated, so that they may be matched with a high degree of accuracy, so that the difference between their starting times may be ascertained, and to insure the fact that they are both being radiated from the same object. Furthermore, as described above, it is anticipated that the source may comprise a radio transmitter borne by a moving aircraft. Since the receiving stations are spaced apart from one another, the value of relative velocity of aircraft motion with respect to each station may be different. Under such conditions, due to the well known Doppler effect, the effective frequency of a given radio carrier transmitted from an aircraft, as sensed by each station, may be different. For example, assume a jet aircraft is traveling along a straight line path connecting stations C and B in Figure 1, and as first monitored, the position of the aircraft is to the right of station C but moving in a direction toward station C and station B. Also assume that the ground velocity of the aircraft is 500 miles per hour and that all receiving stations are displaced from one another by 100 miles. If an *unmodulated* radio carrier, broadcast from the aircraft, was in the order of 100 mc., the signal received by stations C and B would be as much as 100 cycles higher than the signal received by station A. Furthermore, as the aircraft moves along its path, the difference in the frequencies of the received signals will vary or change due to changes in the relative velocity of the craft with respect to the receiving stations.

If prior art "modulation" signal matching techniques, such as described in United States Patent 2,166,991 to Guanella were employed in an attempt to correlate received versions of the unmodulated carrier, little or no time difference information could be obtained since such "product" or "modulation" matching would yield substantially no average output indication. That is, an effort to find a correlation or agreement between two signals of varyingly different frequencies, over reasonable values of smoothing time, would result in information indicating that no correlation or agreement exists. In other words, due to Doppler frequency shift effects, inherent in the receiver-transmitter position relationship contemplated in an air traffic control system embodying the present invention, there may be substantially no coherency between the received versions of an unmodulated carrier. This consideration is of particular importance in practical cases where generally encountered signal to noise ratios in the order of unity may exist at the receiving locations.

The present invention, however, overcomes this difficulty by providing time-difference measuring means responsive to modulation borne by the carrier and of a type which averages out the effects of non-coherent components (such as noise and Doppler shift components) appearing in any two versions of the received signal so that correlation of those aspects of the received signals representing the modulation intelligence may be effected.

More specifically, it is well known in the art, that if the intelligence borne by the modulated carrier is comprised of signal frequencies the maximum value of which is a small percentage of the radio carrier frequency, the modulation intelligence borne by the carrier will be expressed in the form of radio frequency side bands closely associated in frequency with that of the radio carrier itself. The difference in the frequency of the various side bands and that of the carrier represent the frequency make up of the signal intelligence borne by the modulated carrier. It is this type of situation that the present invention contemplates, as for example a radio carrier of 100 mc. modulated by voice signal intelligence for example covering the frequency range of 200 to 3,000 cycles per second. Under these conditions Doppler shift of the radio carrier and side bands due to relative velocity of the aircraft will be expressed in equal percentage frequency of both the carrier and side bands. The resulting shift in the frequency of the modulation intelligence expressed by the difference in the frequencies of the side bands and the carrier will, however, be 100,000,000 times less. Thus by determining the time difference between two versions of the same modulated radio carrier through the use of the above type of correlation process, which process is responsive to the modulation borne by the carrier, high accuracy in time difference measurement may be obtained. Furthermore, since the voice modulation of a carrier is aperiodic and multifrequency in character, correlation processes of the type anticipated by the present invention provide quick and positive position determination by avoiding ambiguities which might otherwise arise through an attempt to correlate or otherwise time match, two unmodulated radio signals of substantially the same frequencies emanating from two aircraft closely positioned with respect to one another while in flight.

Referring now to Figure 3 there is shown a typical correlator and computer center that could be used to accomplish the objects of this invention. As will be noted, the three stations A, B, and C are each shown as having a respective device for receiving modulated energy from a radiating source, such devices being depicted as antennas and being labeled 3. Each antenna 3 is respectively connected to a respective receiver 4 in order that the energy received by the antenna may be amplified and transmitted through communication links 6 to the correlator and computer center. These communication links may be cables laid between the stations and the correlator and computer center, or the stations may transmit their received signals to the center by means of radio or radar communication systems. The antennas, receivers, and communication links are all well known in the art and so no further description is deemed to be necessary here. Suffice it to say that the invention is not limited to radio energy but will operate effectively with any other type of modulated energy emitted by the source. It will be obvious that the antennas and receivers will vary in type with the energy being detected and amplified.

Let us now examine the correlator center portion 5 of the correlator and computer center. The modulated signals from a pair of communication links 6 are fed through a pair of magnetic recording heads 7 and magnetically recorded upon a recorder 8 as a pair of signal tracks 9. recorder 8 being rotated by a motor 10. A pair of magnetic reading heads 11 are respectively associated with the respective tracks 7 and they proceed to pick off the signals from these tracks. One of the heads 11 is physically displaceable from the other so that a time delay will be introduced between the signals so picked off. A timing reference device 12, through a pair of coils 13, places suitable magnetic timing marks upon tracks 9 so that the signals impressed by heads 7 may be time referenced.

The signals and timing reference marks from heads 11 are both fed into a correlator 14, and pair of coils 16 also feed the timing marks into a time distance converter 17. Correlator 14 multiplies together the two signals fed into it and averages their product over a predetermined smoothing time. Movable head 11 is displaced until this averaged product becomes a maximum, the event of this maximum indicating that the coherent aspects of the modulation borne by the recorded signals are then in substantial time coincidence as they reach the correlator 14. The delay introduced by movable head 11 will then be found to be directly proportional to the difference between the two paths taken by energy from the source to stations A and B. Time distance converter 17 is merely a counter which measures the difference between the timing reference marks between heads 11 when the output from correlator 14 is a maximum, this difference measuring the foregoing delay. The output from time distance converter 17 will then be directly proportional to $R_1-R_2$. Since a sharp maximum will only be obtained when coherent modulation aspects of identical signals are matched in time by the correlator, no false radiating energy sources can be indicated since only signals from the same source will cause an output from the correlator to be produced.

A computer center 18 is now provided and into this computer is fed the $R_1-R_2$ from correlator center 5. A similar input is fed into the computer from other correlator center 5 which performs the same operations as the foregoing upon signals received by stations B and C. Into the computer is also fed a signal $2c$ for each pair of stations and corresponding to the distance between each pair of stations. As was noted above in connection with Equation 6, the foregoing information when applied to the computer enables the computer simultaneously to determine the intersection point of the various hyperbolas so defined in order to find the exact values of X and Y corresponding to the position of the radiating source of energy. Computer 18 translates the X and Y of each pair of stations onto a common pair of axes. As will also be noted in connection with this figure, a third input to the computer could be from another correlator center 5 utilizing inputs from stations A and C, and its associated signal $2c$ would be that corresponding to this third pair of stations. A third hyperbola would thereby be defined and its intersection with the other two would serve to define more accurately the position of the radiating source.

Both the correlator center and the computer have been shown in block diagram form because they are well known in the art. With respect to the timing, recording, and correlation portions of the equipment, one type that is suitable for use in the present system is depicted and described in a report published by the Office of Naval Research, Technical Report No. 144, by R. A. Johnson of Cruft Laboratory, Harvard University, Cambridge, Massachusetts, March 25, 1952, and entitled "An Analog Computer for Correlation Functions in Communication Systems." A suitable computer would be the Digitac computer manufactured by the Hughes Aircraft Company, and other suitable computers for performing the relatively simple computations required by this system are also commercially available.

It should be understood that the spacing and location of the stations and correlator and computer center are not critical nor is the present invention limited to any particular type of computer, receiver, or antenna. The correlator, per se, may also take a variety of forms provided, as pointed out above, that the correlation is carried out in response to the modulation bearing aspects of the received signal versions. It should also be clear that although only three stations are shown and described, this is merely because three stations most economically can form either two or three pairs of stations. It is certainly within the scope of the invention to provide four stations for two pairs or six stations for three pairs, where this is deemed to be desirable.

Further, the hyperbolas derived from two pairs of stations may theoretically intersect in more than one point, or else their intersection angle may be so small as to make their intersection point difficult to read. Consequently, while the present invention is not necessarily limited to such a configuration, the preferred embodiment of the invention utilizes three pairs of stations to more positively identify and locate the source of radiating energy. Also, where only two hyperbolas are used, the obviously impossible points of ambiguous intersection can be suppressed by the computer so as to avoid the ultimate development of false position information.

Moreover, it will be obvious that one communications link will be saved when the correlator and computer center is disposed at one of the stations, and that the computations and equipment involved may be simplified by arranging the three stations to form an equilateral triangle, thereby causing $2c$ to be the same constant for each pair of stations. Also, it will be obvious that some of the apparatus in the correlator center illustrated in Figure 3 could be common to the other correlator centers. For example, the timing reference, motor, time distance converter and correlator could be common to all the correlator centers. Perhaps a multichannel recorder could also be used for all of the correlator centers.

While there has been described what is at present considered the preferred embodiment of the invention, it will be obvious to those skilled in the art that various changes and modifications may be made therein without departing from the invention and it is aimed in the appended claims to cover all such changes and modifications as fall within the true spirit and scope of the invention.

What I claim as new and desire to secure by Letters Patent of the United States is:

1. In a target locating system useful in determining the position of a moving craft by intersecting hyperbolic lines of position, and from which craft is conditionally emanated a periodic carrier wave of nominal frequency value, said wave being modulated by aperiodic multifrequency modulation components, the nominal frequency value of said carrier wave being relatively high with respect to the highest frequency represented in said information component, the combination of: at least a first receiving station and a second receiving station displaced from one another by a relatively large known distance such that the respective magnitudes of velocity, which a given moving craft bears relative to said stations, are conditionally different from one another by a substantial amount, the difference in said magnitudes of velocity in turn causing the apparent nominal frequency of a given carrier wave arriving at one station to substantially differ from the apparent nominal frequency of that same carrier wave during its arrival at the other station; first transducing means included at said first receiving station for transducing a given carrier wave of the type described, as received at said first station, into a first electrical signal including a periodic carrier component and aperiodic multifrequency modulation components; second transducing means included at said second receiving station for transducing said same given carrier wave, as received at said second station, into a second electrical signal including a periodic carrier component and aperiodic multifrequency modulation components; means responsive to said first and said second electrical signals for developing an output signal representing substantially only the time-averaged mutual product of said modulation components included in said first and said second electrical signals; and means interposed between at least one of said transducing means and said last named means for imposing controllably variable values of relative delay between the modulation components included in said first and second electrical signals for controlling the value of said output signal.

2. In a target locating system useful in determining the position of a moving craft by intersecting hyperbolic lines of position, and from which craft is conditionally emanated a periodic carrier wave of nominal frequency value, said wave being modulated by aperiodic multifrequency modulation components, the nominal frequency value of said carrier wave being relatively high with respect to the highest frequency represented in said information component, the combination of: at least a first and a second receiving station displaced from one another by a relatively large known distance such that the respective magnitudes of velocity, which a given moving craft bears relative to said stations, are conditionally different from one another by a substantial amount, the difference in said magnitudes of velocity in turn causing the apparent nominal frequency of a given carrier wave arriving at one station to substantially differ from the apparent nominal frequency of that same carrier wave during its arrival at the other station; first transducing means included at said first receiving station for transducing a given carrier wave of the type described, as received at said first station, into a first electrical signal including a periodic carrier component and aperiodic multifrequency modulation components; second transducing means included at said second receiving station for transducing said same given carrier wave, as received at said second station, into a second electrical signal including a periodic carrier component and aperiodic multifrequency modulation components; means responsive to said first and second electrical signals for developing third and fourth electrical signals, respectively, representing substantially only the modulation components included in said first and second electrical signals; means responsive to said third and fourth electrical signals for developing an output signal representing the time-averaged mutual product of the modulation components included in said first and second electrical signals; and means interposed between at least one of said transducing means and said last named means for imposing controllably variable values of relative delay between said third and fourth electrical signals, whereby the relative delay between said third and fourth electrical signals may be controlled to produce a predetermined value of said output signal.

3. In a target locating system useful in determining the positions of and distinguishing between individual members of a plurality of craft bearing relative motion with respect to the earth's terrain, said craft conditionally and contemporaneously transmitting intelligence modulated radio carrier signals at a given assigned signal frequency, the combination of: a first, a second and a third receiving means each positioned at respectively different and substantially displaced locations on the earth's terrain for receiving modulated radio carrier signals at substantially said given assigned frequency and demodulating such received signals to respectively produce a first, a second and a third intelligence signal, each representing substantially only the modulation components of modulated carrier signals received by a respectively different one of said receiving means; first signal developing means responsive to said first and second intelligence signals for developing a first output signal representing the time-averaged mutual product of said first and second intelligence signals; first delay means interposed between at least one of said first and second receiving means and said first signal developing means for imposing controllably variable values of relative delay between said first and second intelligence signals; second signal developing means responsive to said second and third intelligence signals for developing a second output signal representing the time-averaged mutual product of said second and third intelligence signals; second delay means interposed between at least one of said second and third receiving means and said second signal developing means for imposing controllably variable values of relative delay between said second and third intelligence signals; and means responsive to predetermined values of said first and second output signals, taken in combination with the values of relative delay imposed by said first and second delay means which produce said predetermined values of said first and second output signals, for developing position data information depicting the position of a given craft relative to said receiving means.

References Cited in the file of this patent
UNITED STATES PATENTS

| | | |
|---|---|---|
| 1,406,996 | Morrill | Feb. 21, 1922 |
| 2,166,991 | Guanella | July 25, 1939 |
| 2,587,467 | Hawkins | Feb. 26, 1952 |

FOREIGN PATENTS

| | | |
|---|---|---|
| 675,992 | Great Britain | July 23, 1952 |